US007844373B2

(12) United States Patent
Deker

(10) Patent No.: US 7,844,373 B2
(45) Date of Patent: Nov. 30, 2010

(54) METHOD AND A SYSTEM FOR MONITORING THE FOLLOWING OF A REFERENCE TRAJECTORY BY AN AIRCRAFT

(75) Inventor: Guy Deker, Cugnaux (FR)

(73) Assignee: Thales (FR)

( * ) Notice: Subject to any disclaimer, the term of this patent is extended or adjusted under 35 U.S.C. 154(b) by 261 days.

(21) Appl. No.: 11/939,928

(22) Filed: Nov. 14, 2007

(65) Prior Publication Data

US 2008/0140273 A1 Jun. 12, 2008

(30) Foreign Application Priority Data

Nov. 14, 2006 (FR) .................................. 06 09938

(51) Int. Cl.
*G06F 7/70* (2006.01)
(52) U.S. Cl. .............................. 701/14; 701/13; 701/66; 244/75.1
(58) Field of Classification Search ..................... 701/3, 701/10, 13, 14, 9, 66, 206, 211; 244/75.1
See application file for complete search history.

(56) References Cited

U.S. PATENT DOCUMENTS 7,346,437 B2 * 3/2008 Petillon .......................... 701/3

2004/0189492 A1 9/2004 Selk et al.

FOREIGN PATENT DOCUMENTS

| FR | 2783500 | 3/2000 |
|----|---------|--------|
| WO | 9923628 | 5/1999 |

* cited by examiner

*Primary Examiner*—Gertrude Arthur Jeanglaud
(74) *Attorney, Agent, or Firm*—Lowe Hauptman Ham & Berner, LLP

(57) ABSTRACT

The present invention relates to a method and a system for monitoring the following of a reference trajectory by an aircraft. The values that flight parameters of the aircraft will have on completion of a time interval $\Delta T$ are extrapolated, the time interval $\Delta T$ corresponding to a duration less than the remaining duration of validity of a guidance instruction presently applied by the aircraft and during which the instruction remains unchanged, by measuring at the start of the time interval $\Delta T$ the actual values of the flight parameters as well as external conditions on which the performance of the aircraft depends, then by making the assumption that the instruction values of the flight parameters will remain constant throughout the time interval $\Delta T$, an alarm being raised if the extrapolated values of the flight parameters are not substantially equal to theoretical values of the flight parameters deduced from the reference trajectory on completion of the time interval considered $\Delta T$ or if they are not compatible with the actual performance of the aircraft having regard to the measured external conditions.

20 Claims, 2 Drawing Sheets

METHOD AND A SYSTEM FOR MONITORING THE FOLLOWING OF A REFERENCE TRAJECTORY BY AN AIRCRAFT

RELATED APPLICATIONS

The present application is based on, and claims priority from, France Application Number 06 09938, filed Nov. 14, 2006, the disclosure of which is hereby incorporated by reference herein in its entirety.

FIELD OF THE INVENTION

The present invention relates to a method and a system for monitoring the following of a reference trajectory by an aircraft. It applies for example in the avionics sector.

BACKGROUND OF THE INVENTION

A flight plan is the detailed description of the route to be followed by an aircraft within the framework of a scheduled flight. It comprises notably a chronological sequence of waypoints described by their position, altitude and overflight time. The waypoints constitute the trajectory to be followed by the aircraft with a view to best complying with its flight plan. This reference trajectory constitutes a valuable aid both to the control personnel on the ground and also to the pilot, for anticipating the movements of the airplane and thus ensuring an optimum safety level. The flight plan is commonly managed on board civil airplanes by a flight management system that will be referred to as the FMS subsequently, which notably makes the reference trajectory available to the personnel aboard and available to the other onboard systems.

With a view to safety essentially, it is therefore necessary to ensure that the airplane follows at least in geographical terms and possibly in timetable terms the reference trajectory described in its flight plan. For this purpose, guidance procedures make it possible at the minimum to slave the airplane in space to the 3D trajectory corresponding to the reference trajectory. But before formulating a guidance instruction, it is necessary first of all to ensure that the flight segments ahead of the airplane in the short-term and medium-term can actually be overflown, for example that their overflight is compatible with the performance of the airplane and can be done in compliance with the safety standards. Firstly, it is appropriate to verify that the scheduled route is indeed continuous ahead of the airplane, that is to say it does not exhibit any gap. Specifically, a flight plan can exhibit route discontinuities, notably just where it is envisaged that the flight be performed according to manual flight or fly by visual flight rules. But it also happens that waypoints are deleted without an alternative being given by the pilot or else that the system fails to replace them automatically. In all these cases, of course, it is impossible to establish guidance instructions. Secondly, it is appropriate for example to verify that the horizontal trajectory ahead of the airplane does not impose angles of roll while turning or load factors that the airplane would not be able to withstand. Specifically, the actual conditions may be different with respect to the moment when the turn was defined theoretically, for example in terms of wind. It is also appropriate to verify that the trajectory ahead of the airplane does not require excessive climb or descent slopes, or else excessive or too low speeds that the airplane would not be able to follow, or indeed which would imperil the safety of the flight. All these checks must be made so that discrepancies that are prejudicial both at the performance level and at the safety level do not get passed on late.

So, robustness problems arise with the trajectory data, the latter becoming invalid or poorly suited to the least unforeseen thing. Since in addition to the numerous cases of trajectory discontinuity, the reference trajectory often does not take account of the current specificities of the airplane, since this is not its job. Specifically, the reference trajectory has been calculated in advance when formulating the flight plan, by making assumptions not only about continuity but also about nominal flight conditions of the airplane in terms of performance, flight limits or meteorological conditions. These assumptions often lead to temporary inaccuracies during the flight, or indeed to inconsistencies.

First of all, these assumptions represent ideal external conditions, notably the meteorological conditions, since the latter are hard to forecast with a high confidence level for flights which have to take place in several days. Thus, the actual flight conditions often turn out to be conspicuously different from the forecast conditions, notably in terms of wind to which an aircraft is very sensitive. The wind being variable with altitude and generally being manifested as gusts, the resulting discrepancies are moderate but very changeable.

Thereafter, these assumptions represent a normal operational situation of the craft throughout the flight, the flight model having been supplied with the nominal performance corresponding to the type of craft. But in the event of a fault impacting the actual performance of the airplane, a fault with an engine or a control surfaces fault for example, the airplane is no longer capable of flying its profile such as described in the flight plan on the basis of nominal performance. Its performance is degraded and is specific to the fault or to the combination of faults that have arisen. The case of old airplanes whose performance is degraded because of wear to their engines may also be mentioned. The discrepancies due to degraded performance can be significant, but they are often stable over time.

Finally, it is also possible to envisage the case where the system used to formulate the flight plan does not have a sufficiently up-to-date database at its disposal. It then uses a default performance in its calculations, yet which performance does not quite correspond to that of the craft actually used. Specifically, mention should be made of the low update rate of the databases in these systems.

Current FMS systems seek neither to anticipate nor to correct these problems since this would lead to complex and unwieldy calculations. They display the reference trajectory with possible discontinuities and without verifying, notably during manual flight, whether the airplane is capable of flying the trajectory ahead of it, the airplane then operating in a mode based on notions of target holding, the time to regain a continuous and flyable trajectory. The pilot copes with anything unforeseen in the immediate future by modifying the behavior of the airplane by virtue of the piloting commands. Consequently, the airplane does not exactly follow the reference trajectory extracted from its flight plan when the latter comprises discontinuities. In certain cases it may even diverge considerably therefrom. If appropriate, it is paradoxically the reference trajectory which is updated so that it reflects the actual trajectory, thus making it possible to place the airplane back on a scheduled route at least in the short-term. In a context of fairly loose air traffic management, it is possible to be satisfied with such a situation, notably by virtue of the anticollision alert systems of the "Traffic Collision Avoidance System" type, which make it possible in parallel to ensure short-term safety. But the same is no longer so with the most recent navigation rules, which impose or will impose the closest possible compliance not only with the 3D route filed in the flight plan, but also with the timetables. Compliance with timetables improves safety, but above all optimizes cost through better management of the fleet and infrastructures related to air traffic such as airports for example. The aircraft separation constraints become very significant in areas where, in parallel with this, the traffic is highly concentrated. It is therefore appropriate to follow as closely as possible the reference trajectory described in the flight plan.

SUMMARY OF THE INVENTION

The aim of the invention is notably to alleviate the aforesaid drawbacks by anticipating the problems, thus placing the pilot in a more comfortable situation for deciding corrective measures. For this purpose, the subject of the invention is a method for monitoring the following of a reference trajectory by an aircraft. The values that flight parameters of the aircraft will have on completion of a time interval are extrapolated, the time interval corresponding to a duration less than the remaining duration of validity of a guidance instruction presently applied by the aircraft and during which the instruction remains unchanged. The values of the flight parameters are estimated by measuring first of all at the start of the time interval the actual values of the flight parameters as well as external conditions on which the performance of the aircraft depends. Then, the assumption is made that the instruction values of the flight parameters will remain constant throughout the time interval. An alarm is raised if the extrapolated values of the flight parameters are not substantially equal to theoretical values of the flight parameters deduced from the reference trajectory on completion of the time interval considered or if they are not compatible with the actual performance of the aircraft having regard to the measured external conditions.

For example, the flight parameters of the aircraft whose actual values are measured at the start of the time interval, then whose instruction values are assumed constant throughout the interval, can include the speed or the acceleration or the fuel consumption or the climb/descent rate or the air slope.

Advantageously, the flight parameters of the aircraft whose values on completion of the time interval are extrapolated can include the position or the speed or the altitude or the quantity of fuel remaining or the ground slope.

The external conditions whose actual values are measured at the start of the time interval, then which are assumed constant throughout the interval, can include the direction and the speed of the wind, or the temperature and the density of the air, or the atmospheric pressure.

New guidance instructions for converging and remaining on the reference trajectory can be formulated in the case where the extrapolated values of the flight parameters would not be substantially equal to the theoretical values deduced from the reference trajectory on completion of the time interval considered. New guidance instructions for remaining compatible with the performance of the aircraft can also be formulated in the case where the extrapolated values of the flight parameters would not be compatible with the actual performance of the aircraft having regard to the measured external conditions.

Advantageously, the measured values of the external conditions on which the performance of the aircraft depends can be used as a function of their prospects of persisting throughout the time interval during which they are assumed constant.

The duration of the time interval can determine a type of alarm, each type of alarm corresponding to a pair comprising a minimum duration and a maximum duration.

The values that the flight parameters of the aircraft will have on completion of the time interval can be extrapolated by making the assumption that the reference trajectory is a sequence of adjoining segments, at least at the start of the part of the reference trajectory overflown during the time interval.

The subject of the invention is also a system for monitoring the following of a reference trajectory by an aircraft implementing the method according to the invention. In one embodiment, it can comprise a short-term monitoring sub-module and a medium-term monitoring sub-module.

Each of the sub-modules can filter out the events on which it extrapolates the values that the flight parameters of the aircraft will have on completion of the time interval, as a function of their prospects of persisting during the time interval, so as to limit false alarms.

The extrapolations carried out by the medium-term monitoring sub-module can be used to confirm or deny the extrapolations made by the short-term monitoring sub-module, also so as to limit false alarms.

The main advantages of the invention are further that it can be implemented by computer within existing onboard software systems, such as within an FMS system for example. The invention can be carried out in a very modular manner, limiting the impact on the other systems. It uses standard data which are already provided by sensors on numerous airplanes. Thus, its cost of integration is low, only the man-machine interfaces being more or less impacted on account of the new alarms. Additionally, the invention makes it possible to adapt the alarms dispatched to the type of display module connected. For example the alarms dealing with the altitude can be dispatched to a module dedicated to the viewing of the vertical flight profile and the alarms dealing with the lateral deviation can be dispatched to a module dedicated to the viewing of the horizontal flight profile. Or else, the short-term alarms can be dispatched to a module making it possible to display the information exhibiting an emergency character.

BRIEF DESCRIPTION OF THE DRAWINGS

Other characteristics and advantages of the invention will appear with the aid of the description which follows offered in relation to appended drawings which represent.

DETAILED DESCRIPTION OF THE DRAWINGS

Figures 1A, 1B:
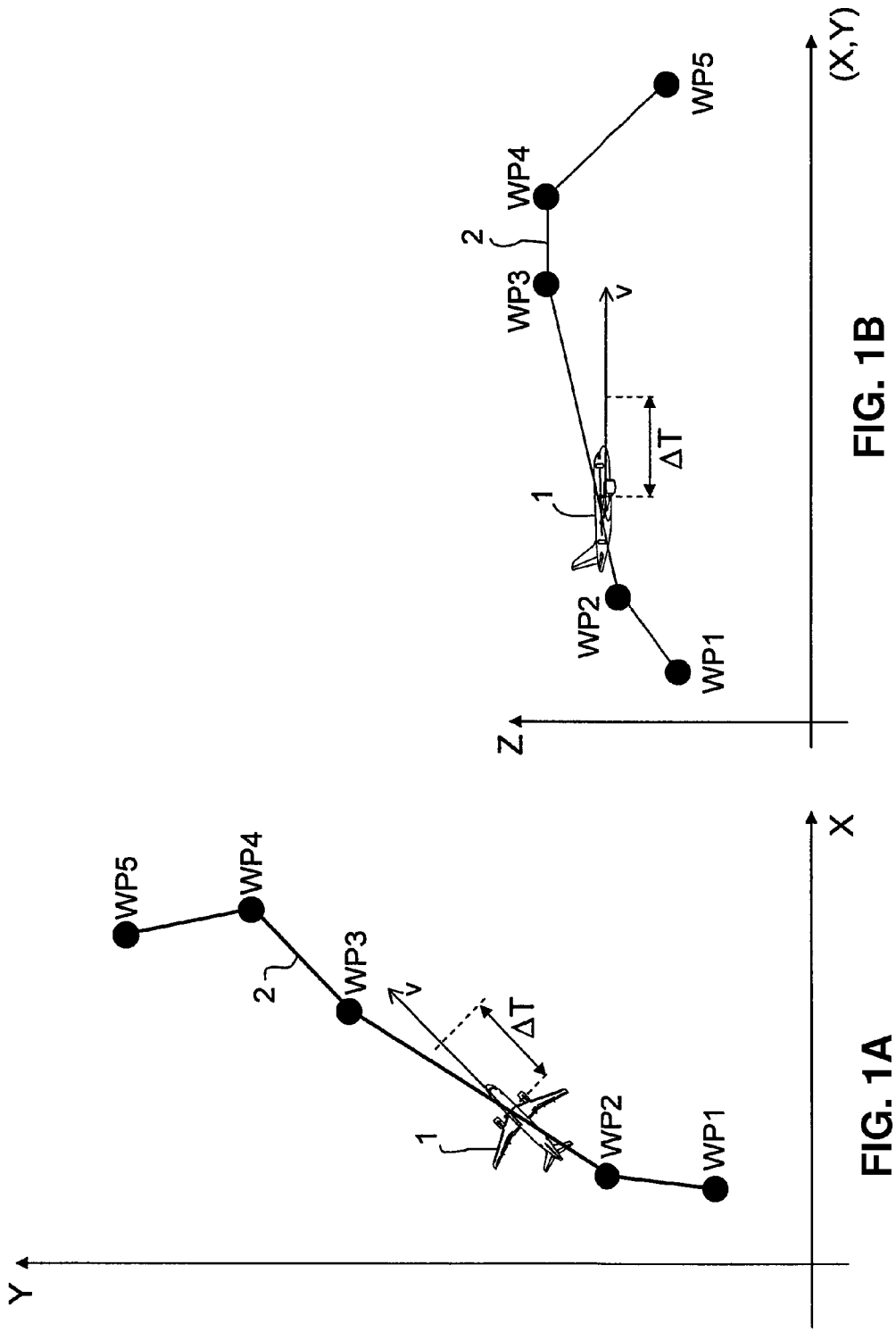
FIG. 1A, an illustration of an airplane following in the horizontal plane a reference trajectory, FIG. 1B, an illustration of an airplane following in the vertical plane a reference trajectory, FIG. 2, a diagram of the functional architecture of a system implementing the invention.

In a system of axes where the abscissa X and the ordinate Y represent distances on the ground, FIG. 1A illustrates an airplane 1 following in the horizontal plane a reference trajectory 2 defined by five waypoints WP1, WP2, WP3, WP4 and WP5. A vector v represents the speed vector of the airplane 1 in the horizontal plane. Manifestly, the airplane 1 is on its reference trajectory 2 in the horizontal plane but it risks leaving it if it does not modify its heading. In a system of axes where the abscissa (X,Y) represents a distance on the ground and where the ordinate Z represents the altitude, FIG. 1B illustrates the same airplane 1 following in the vertical plane the same reference trajectory 2 defined by the five waypoints WP1, WP2, WP3, WP4 and WP5. The same vector v represents the speed vector of the airplane in the vertical plane. Manifestly, the airplane 1 is also on its reference trajectory 2 in the vertical plane but it risks leaving it if it does not modify its climb/descent rate. Generally, the terminology "state vector" will designate the datum of the set of flight parameters of an aircraft, the flight parameters being defined here as the instantaneous characteristics such as the kinematics in position, speed and acceleration, the heading, the climb/descent rate or any other instantaneous value that may influence the position of the aircraft in the future. This can even include the mass of the aircraft and the quantity of kerosene remaining. Within the particular framework of the purely spatial illustrations of FIGS. 1A and 1B, the state vector of the airplane 1 is represented by the vector v.

The present invention proposes to project the state vector v of the airplane 1 into the future by a time ΔT, that is to say to extrapolate by calculations what will be the state vector of the airplane 1 when the time ΔT has elapsed, making the assumption that the independent components of the vector v are constant during the time interval ΔT. For example, the independent components considered can be the acceleration or the speed, the heading and the climb/descent rate or the slope of the airplane 1 with respect to an air mass (air slope). It can also be envisaged to consider kerosene consumption. The time interval ΔT is the duration of validity of a guidance instruction presently applied by the aircraft, that is to say the duration for which the guidance instruction ought not to be changed, or a slightly lower duration. This is why during the time interval ΔT, the independent components of the vector v, which correspond to instruction values of flight parameters, can be assumed constant. The "image" state vector under this projection by ΔT into the future differs from the vector v only through its kinematics in position, altitude and speed. It can also be envisaged to estimate the angles of inclination in roll/pitch/yaw during turns as well as the kerosene remaining. In order to perform these predictions accurately, mathematical models taking account of the actual performance of the airplane 1 in view of its engine configuration and its structure, and no longer of standard performance or default performance, are supplied with actual values of the flight parameters. These values are measured by appropriate sensors in a quasi immediate manner at the time of the calculations. For example, the position of the airplane can be measured by virtue of a satellite triangulation positioning beacon (GPS). The acceleration of the airplane and the load factor applied to it can be measured by an inertial platform. The heading of the airplane can be measured accurately by a magnetic compass. The mathematical models are very highly tuned and also take account of the current environment of the airplane: they can be supplied with parameter values characterizing the actual external conditions such as for example the direction and the speed of the wind or the temperature of the air or else the atmospheric pressure. These parameter values are measured by suitable meteorological sensors. It should nevertheless be noted that the mathematical models used, although highly tuned, are conventional models known elsewhere. Notably they can include a 3D trajectography model. But it can also be envisaged to include an inclination model or a kerosene consumption model. The trajectory thus calculated can reveal anomalies of behaviour in relation to the reference trajectory 2 or reveal flight risks in relation to the constraints linked with the actual performance of the airplane and with its current environment. First of all, the calculated trajectory may for example highlight inaccurate navigation. As illustrated in FIGS. 1A and 1B, at the time horizon ΔT the airplane 1 will deviate markedly from the lateral and vertical instructions given in its reference trajectory 2. The calculated trajectory can also highlight the more or less long term occurrence, according to the value of ΔT, of a local discontinuity, of an excessive tangential or vertical speed, of an angle of inclination or of a slope that is too large with respect to the ground (ground slope) or else of too high a load factor with respect to the actual performance of the craft in the current climatic conditions. Thus, the present invention extends the concept of monitored trajectory beyond a simple 3D path and encompasses navigation quality, the latter being measured by way of sensors. It should be noted above all that the flight anomalies or risks are not only detected, but are also and above all anticipated with the notice ΔT.

In "selected" mode, according to the English terminology, which is a navigation mode during which the pilot manually requests the automatic pilot to apply tactical instructions which are not formulated by the flight management system and which are therefore independent of the scheduled route, it receives these instructions for example from the air traffic controller. Short-term predictions can be calculated periodically, predictions based on the current flight intentions. These predictions are compared with the reference trajectory 2 and with the performance of the airplane under the current climatic conditions. According to the type of anomaly and/or risk detected and according to their criticality level, an alarm intended for the pilot can be raised when there is a risk that the short-term trajectory cannot be flown for performance or safety reasons.

In "managed" mode, according to the English terminology, which is a navigation mode during which the automatic pilot applies instructions formulated by the flight management system in accordance with the reference trajectory 2, the predictions are calculated by taking account of the reference trajectory. If the airplane is not quite on the reference trajectory, the predictions take account of an immediate joining manoeuvre for regaining the reference trajectory as quickly as possible at the reference speed. Here again, according to the type of anomaly and/or risk detected and according to their criticality level, an alarm intended for the pilot can be raised. In this "managed" mode, an alarm can only be raised if a manual command is ordered by the pilot. In both modes, "selected" or "managed", an alarm can be raised at any time and guidance instructions for remaining on the reference trajectory 2 or remaining compatible with the performance of the aircraft 1 can be proposed to the pilot.

For example, the alarm can be visual and can specify the nature of the datum of the prediction that caused the alarm to be raised, such as a slope that is too high or an overspeed. The pilot then can manually correct the flight behaviour of the airplane 1 through the flight controls with a view to preventing the announced prediction from actually being fulfilled. In this case, the newly calculated predictions will give a different result, they ought no longer to cause an alarm to be raised and the reference trajectory prediction 2 will be reupdated by the FMS system to take account of this new reference. The pilot can also remain passive and let the airplane 1 continue its flight under the same conditions. In this case, the newly calculated predictions will give the same result, they ought still to cause an alarm to be raised. In a similar manner to the current solutions, the reference trajectory 2 ought to then undergo an update by the FMS system, notably a modification of the instructions to make it possible to satisfy the current constraints. But by virtue of the present invention, the pilot will not be surprised by this update and will have time to prepare the best possible reaction. The invention thus turns out to be a valuable anticipation and decision aid tool.

According to the intended operational objective and the constraints taken into account, the present invention can make it possible to undertake very short-term anticipation, with a time interval ΔT of less than a minute. The predictions are then performed on the segment currently being overflown by the airplane 1, in this instance the segment WP2-WP3, according to a high periodicity of the order of a re-calculation every 100 or 200 ms. The predictions take account in real time of any immediate development in the context, in particular sudden wind shifts and gusts. The time-limited range limits the false alarm rate. Specifically, the further into the future the current flight parameters of the airplane 1 are extrapolated, the less chance they have of positioning the airplane 1 on its reference trajectory 2 and the more they risk raising alarms for inconsistency with respect to the scheduled route. In the very short term notably and with a view to maintaining real-time constraints, the trajectography model can make the assumption that the reference trajectory is a simple sequence of adjoining segments. The present invention can also make it possible to undertake medium-term anticipation with a time interval ΔT of the order of a few minutes under 10 minutes. The predictions are then performed on flight segments following the current segment, in this instance WP3-WP4 and WP4-WP5, according to a lower periodicity of the order of a re-calculation every few seconds. In this case, a priori filtering out of false alarms can be proposed. This may for example involve filtering out the events representing overly fast developments in context and which would not be relevant in the long-term, sudden wind shifts or gusts notably. For example, this may make it possible not to trigger an alarm for a gust which stops after 30 seconds, this being a frequent case. Within the context of the invention, the relevance of an event must therefore notably be understood as representing the prospects of the event persisting over the time interval considered for making the predictions. Different alarms can also make it possible to distinguish short-term anomalies or risks from longer term anomalies or risks according to the time interval ΔT that enabled their detection.

Figure 2:
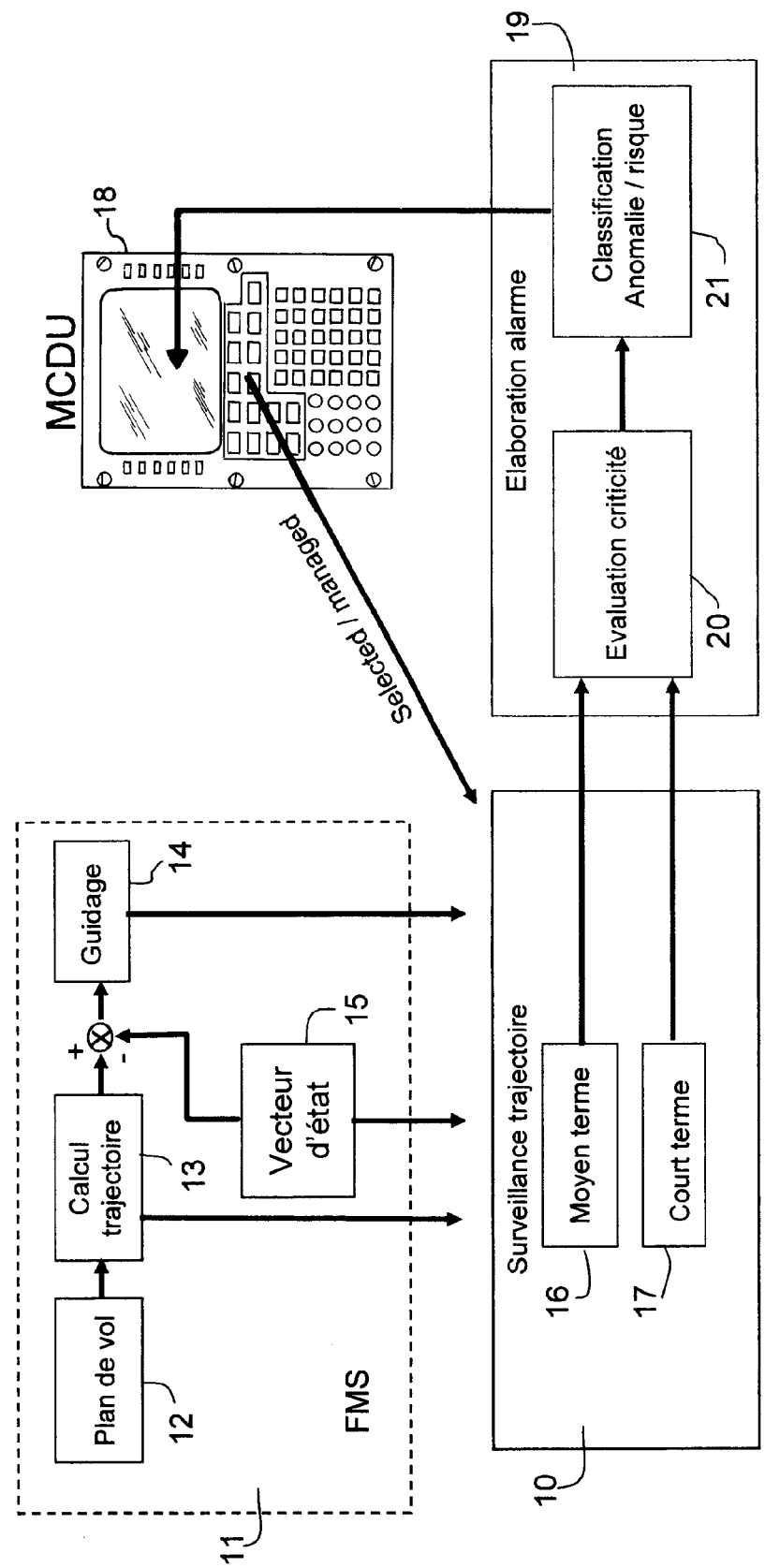

FIG. 2 illustrates through a diagram the functional architecture of an onboard computer system implementing the invention described above.

An FMS system 11 encompasses various functions related to the following of the flight plan. Notably, the FMS system 11 includes a module 12 for pure management of the flight plan and a module 13 for formulating a reference trajectory on the basis of the flight plan provided by the module 12. A calculated-trajectory monitoring module 10 and an alarm formulation module 19 implement the method according to the invention described above. In order to ensure autonomous and continuous monitoring, the module 10 is independent of the FMS system 11. Ideally the module 10 is even situated in a different partition so as to avoid any risk of interruption by a function of the FMS system 11. Thus the criticality of the monitoring function may be greater than the criticality of the trajectory formulation and guidance functions of the FMS system 11. The trajectory formulation module 13 provides the monitoring module 10 with the reference trajectory, such as for example the trajectory 2 of FIGS. 1A and 1B. The module 10 also receives the airplane state vector, such as for example the vector v of FIGS. 1A and 1B, from a module 15 hosted by the FMS system 11. The state vector has been formulated on the basis of actual data measured by sensors, such as the airplane's position and speeds measured by a hybridized GPS beacon with an inertial platform for example. It also receives the operating mode, "selected" or "managed", described above from a module 18 termed "Multi-purpose Control Display Unit" according to the English terminology (MCDU), which is a multi-use alphanumeric input and display console. The monitoring module 10 therefore calculates its predictions according to the invention on the basis of the reference trajectory received from the module 13 and the state vector received from the module 15. On the basis notably of the airplane's position contained in the state vector, the module 10 first of all determines the active segment of the reference trajectory, that is to say the segment which is currently being overflown. Then, medium-term and short-term prediction sub-modules 16 and 17 can respectively analyse in order and according to a suitable time notice the continuity of the trajectory, the accuracy of navigation about the reference trajectory, the compatibility of the trajectory in terms of angle of roll with respect to the performance of the airplane, the compatibility of the trajectory in terms of slope, climb/descent rate or load factor, still with respect to the performance of the airplane and possibly with respect to the requested comfort conditions. The short-term prediction sub-module 17 undertakes anticipation at a markedly shorter time interval than the medium-term sub-module 16. Orders of magnitude have previously been given elsewhere. Such a separation between the short term and the medium term advantageously makes it possible to sort the external conditions according to their relevance before providing them to the two calculation sub-modules. Optionally, the sub-modules 16 and 17 can also compare the guidance instructions formulated by a module 14 on the basis of the reference trajectory that it receives directly from the module 13 and of the state vector of the airplane that it receives directly from the module 15. As explained previously the sub-modules 16 and 17 take account only of the instructions or constraints that are relevant with respect to the time interval ΔT, which they apply to calculate their respective predictions. The flight anomalies and risks detected are dispatched by the sub-modules 16 and 17 to the module 19 for formulating the alarms. They are received by a sub-module 20 for evaluating criticality, in charge of evaluating whether the anomalies and risks received are proper cause for an alarm to be raised. For example, the module 20 relies on thresholds to undertake its evaluations. Anomalies and risks whose criticality is judged sufficient to raise an alarm are provided to a classification sub-module 21, which sorts them so as notably to determine the man-machine interface most suited to the situation. For example, an anomaly or risk of low criticality can be reported visually to the pilot by way of the MCDU 18.

Advantageously, the short-term prediction sub-module 17 can also perform its estimations with fast reactivity and weak filtering out of the events which are not relevant in the short-term, while the medium-term prediction sub-module 16 can perform its estimations with a slower reactivity but a stricter filtering out of the events which are not relevant in the medium-term. The estimations of the medium-term prediction sub-module can thus be used to confirm or deny the alarms potentially raised by the short-term prediction module.

The invention can thus be implemented in existing systems at very low cost. This development makes it possible to render the trajectory more robust, more secure and therefore more reliable by taking account of the actual current conditions rather than of nominal, ideal or default conditions. It makes it possible furthermore to differentiate short-term alarms from medium-term alarms and therefore to filter out false alarms better.

The invention claimed is:

1. A method for monitoring a following of a reference trajectory by an aircraft, wherein the values that flight parameters of the aircraft will have on completion of a time interval (ΔT) are extrapolated, the time interval (ΔT) corresponding to a duration less than a remaining duration of validity of a guidance instruction presently applied by the aircraft and during which the instruction remains unchanged, extrapolating the values comprising the steps of:
measuring at the start of the time interval ($\Delta T$) actual values of the flight parameters as well as external conditions on which performances of the aircraft depends;
considering that instruction values of the flight parameters will remain constant throughout the time interval ($\Delta T$);
raising an alarm if extrapolated values of the flight parameters are different from theoretical values of the flight parameters deduced from the reference trajectory on completion of the time interval considered ($\Delta T$) or if they are not compatible with actual performances of the aircraft having regard to the measured external conditions.

2. The method as claimed in claim 1, wherein the flight parameters of the aircraft whose actual values are measured at the start of the time interval ($\Delta T$), then whose instruction values are assumed constant throughout the interval ($\Delta T$), include in a non-exhaustive manner a speed and/or an acceleration and/or a fuel consumption and/or a climb/descent rate and/or an air slope.

3. The method as claimed in claim 1, wherein the flight parameters of the aircraft whose values on completion of the time interval ($\Delta T$) are extrapolated include in a non-exhaustive manner a position and/or an altitude and/or a speed and/or a ground slope and/or a quantity of fuel remaining.

4. The method as claimed in claim 1, wherein the external conditions whose actual values are measured at the start of the time interval ($\Delta T$), then which are assumed constant throughout the interval ($\Delta T$), include in a non-exhaustive manner a direction and a speed of the wind and/or a temperature of the air and/or a density of the air and/or an atmospheric pressure.

5. The method as claimed in claim 1, wherein new guidance instructions for converging and remaining on the reference trajectory are formulated in the case where the extrapolated values of the flight parameters are not substantially equal to the theoretical values deduced from the reference trajectory on completion of the time interval considered ($\Delta T$).

6. The method as claimed in claim 1, wherein new guidance instructions for remaining compatible with the performance of the aircraft formulated in the case where the extrapolated values of the flight parameters are not compatible with the actual performance of the aircraft having regard to the measured external conditions.

7. The method as claimed in claim 1, wherein the measured values of the external conditions on which the performance of the aircraft depends are used as a function of their prospects of persisting throughout the time interval ($\Delta T$) during which they are assumed constant.

8. The method as claimed in claim 1, wherein the duration of the time interval ($\Delta T$) determines a type of alarm, each type of alarm corresponding to a pair comprising a minimum duration and a maximum duration.

9. The method as claimed in claim 1, wherein the values that the flight parameters of the aircraft will have on completion of the time interval ($\Delta T$) are extrapolated by considering that the reference trajectory is a sequence of adjoining segments.

10. The system for monitoring the following of a reference trajectory by an aircraft, wherein a method as claimed in claim 1 is implemented.

11. The system as claimed in claim 10, comprising a short-term monitoring sub-module and a medium-term monitoring sub-module.

12. The system as claimed in claim 11, wherein each of the sub-modules filters out the events on which it extrapolates the values that the flight parameters of the aircraft will have on completion of the time interval ($\Delta T$), as a function of their prospects of persisting during the time interval ($\Delta T$), so as to limit false alarms.

13. The system as claimed in claim 11, wherein the extrapolations carried out by the medium-term monitoring sub-module are used to confirm or deny the extrapolations made by the short-term monitoring sub-module, so as to limit false alarms raised by the short-term monitoring sub-module.

14. The system as claimed in claim 10, wherein the flight parameters of the aircraft whose actual values are measured at the start of the time interval ($\Delta T$), then whose instruction values are assumed constant throughout the interval ($\Delta T$), include in a non-exhaustive manner a speed and/or an acceleration and/or a fuel consumption and/or a climb/descent rate and/or an air slope.

15. The system as claimed in claim 10, wherein the flight parameters of the aircraft whose values on completion of the time interval ($\Delta T$) are extrapolated include in a non-exhaustive manner a position and/or an altitude and/or a speed and/or a ground slope and/or a quantity of fuel remaining.

16. The system as claimed in claim 10, wherein the external conditions whose actual values are measured at the start of the time interval ($\Delta T$), then which are assumed constant throughout the interval ($\Delta T$), include in a non-exhaustive manner a direction and a speed of the wind and/or a temperature of the air and/or a density of the air and/or an atmospheric pressure.

17. The system as claimed in claim 10, wherein new guidance instructions for converging and remaining on the reference trajectory are formulated in the case where the extrapolated values of the flight parameters are not substantially equal to the theoretical values deduced from the reference trajectory on completion of the time interval considered ($\Delta T$).

18. The system as claimed in claim 10, wherein new guidance instructions for remaining compatible with the performance of the aircraft are formulated in the case where the extrapolated values of the flight parameters are not compatible with the actual performance of the aircraft having regard to the measured external conditions.

19. The system as claimed in claim 10, wherein the measured values of the external conditions on which the performance of the aircraft depends are used as a function of their prospects of persisting throughout the time interval ($\Delta T$) during which they are assumed constant.

20. The system as claimed in claim 10, wherein the duration of the time interval ($\Delta T$) determines a type of alarm, each type of alarm corresponding to a pair comprising a minimum duration and a maximum duration.

* * * * *